(12) United States Patent
Tian (10) Patent No.: US 10,328,774 B2
(45) Date of Patent: Jun. 25, 2019

(54) VANE ADJUSTMENT DEVICE FOR AN AIR REGISTER AND AN AIR REGISTER ASSEMBLY

(71) Applicant: FORD GLOBAL TECHNOLOGIES, LLC, Dearborn, MI (US)

(72) Inventor: Bao Jun Tian, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 15/433,056

(22) Filed: Feb. 15, 2017

(65) Prior Publication Data

US 2017/0240025 A1   Aug. 24, 2017

(30) Foreign Application Priority Data

Feb. 22, 2016   (CN) .......................... 2016 1 0096486

(51) Int. Cl.
*B60H 1/34* (2006.01)

(52) U.S. Cl.
CPC ... *B60H 1/3421* (2013.01); *B60H 2001/3464* (2013.01)

(58) Field of Classification Search
USPC ........................................................ 454/155
See application file for complete search history.

(56) References Cited

U.S. PATENT DOCUMENTS

| | | | | |
|---|---|---|---|---|
| 4,796,518 A * | 1/1989 | Murray | ................ | B60H 1/3421 454/155 |
| 5,480,350 A * | 1/1996 | Naruse | ................ | B60H 1/3421 454/155 |
| 5,599,230 A * | 2/1997 | Naruse | ................ | B60H 1/3421 454/155 |
| 5,722,833 A * | 3/1998 | Fischer | ................ | A61K 6/0017 216/49 |
| 6,533,655 B2 * | 3/2003 | Demerath | ............ | B60H 1/3421 454/155 |
| 2001/0031619 A1 * | 10/2001 | Yabuya | ................ | B60H 1/3421 454/155 |
| 2004/0171344 A1 | 9/2004 | Krause | | |

(Continued)

FOREIGN PATENT DOCUMENTS

| | | |
|---|---|---|
| CN | 201476234 U | 5/2010 |
| CN | 201637051 U | 11/2010 |
| CN | 201753974 U | 3/2011 |

(Continued)

OTHER PUBLICATIONS

English Machine Translation of CN201753974U.

(Continued)

*Primary Examiner* — Helena Kosanovic
(74) *Attorney, Agent, or Firm* — Vichit Chea; King & Schickli, PLLC (57) ABSTRACT

A vane adjustment device in an air register includes a front vane connector pivotably connected to a front vane and a rear vane connector pivotably connected to a rear vane. The front vane connector includes a sliding member substantially perpendicular to a longitudinal direction of the front vane and the rear vane connector includes a first joint. The first joint is movably connected to the sliding member to enable a linear movement of the sliding member relative to the first joint.

20 Claims, 10 Drawing Sheets

(56) References Cited

U.S. PATENT DOCUMENTS

2006/0014485 A1* 1/2006 Sousa .................. B60H 1/3421
454/315

FOREIGN PATENT DOCUMENTS

| CN | 203132081 U | 8/2013 |
|---|---|---|
| CN | 204063490 U | 12/2014 |
| EP | 2505397 B1 | 7/2014 |

OTHER PUBLICATIONS

English Machine Translation of CN203132081U.
English Machine Translation of CN204063490U.
English Machine Translation of CO201476234U.
English Machine Translation of CO201637051U.
English Machine Translation of EP2505397B1.

* cited by examiner

VANE ADJUSTMENT DEVICE FOR AN AIR REGISTER AND AN AIR REGISTER ASSEMBLY

RELATED APPLICATION(S)

This application claims the benefit of Chinese New Invention Patent Application No.: CN 201610096486.2, filed Feb. 22, 2016, the entire contents thereof being incorporated herein by reference.

TECHNICAL FIELD

The present disclosure relates generally to a vane adjustment device in an air register and an air register assembly.

BACKGROUND

A vehicle normally includes an air conditioning system or a heating ventilation and air conditioning (HVAC) system to provide passenger comfort. Moreover, air registers in the HVAC system may be adjusted to realize a desired angle of air flow and flow rate for the passengers. Various types of air register adjustment mechanisms have been developed in this field.

For instance, CN patent No. 201476234 discloses a vehicle register having horizontal vanes and a tab connected to the vane to adjust an angle of air flow.

SUMMARY

According to one aspect of the present disclosure, a vane adjustment device is provided. The vane adjustment device may include a front vane connector pivotably connected to a front vane. The front vane connector may include a sliding member substantially perpendicular to a longitudinal direction of the front vane. A rear vane connector is pivotably connected to a rear vane. The rear vane connector may include a first joint. The first joint may be movably connected to the sliding member to enable a linear movement of the sliding member relative to the first joint.

In one embodiment, the sliding member may have a bar shape and the first joint may include a sleeve to receive the bar-shaped sliding member.

In another embodiment, the rear vane connector may include a second joint connected to the first joint at an angle, and the second joint may include a sleeve to receive a towel bar on the rear vane to enable a linear movement of the second joint relative to the towel bar.

In another embodiment, the second joint may include a groove extending longitudinally thereon.

In another embodiment, the second joint may be substantially perpendicular to the first joint.

In another embodiment, the first joint may include a sleeve and the first and second joints may be formed integrally.

In another embodiment, the sliding member may include at least a partially hollowed sleeve portion. The first joint may have a bar shape and may be received in the sleeve portion to enable a linear movement of the sliding member relative to the sleeve portion.

In another embodiment, an end of the first joint may include an aperture to receive a towel bar on the rear vane to enable a linear movement of the first joint relative to the towel bar.

In another embodiment, the front vane connector may include a shaft connected to the sliding member at an angle, and the shaft is pivotably connected to the front vane.

In another embodiment, the shaft and the sliding member may be substantially perpendicular to each other.

According to another aspect of the present disclosure, a vehicle air register assembly is provided. The vehicle air register may include a first front vane extending along a first direction, a first rear vane extending along a second direction and a vane adjustment device. The vane adjustment device may include a front vane connector connected to the first front vane and a rear vane connector connected to the first rear vane. The front vane connector may have a shaft pivotably connected to the first front vane and a sliding member substantially perpendicular to the shaft. The rear vane connector may include a first joint and the sliding member may be movably connected to the first joint to enable a linear movement relative to the first joint.

In one embodiment, the sliding member may have a bar shape and the first joint may include a sleeve to at least partially receive the sliding member.

In another embodiment, the rear vane connector may include a second joint connected to and being perpendicular to the first joint.

In another embodiment, the first rear vane may include a towel bar substantially parallel to the longitudinal direction of the rear vane. The second joint may be movably connected to the towel bar and may be linearly movable between a first position and a second position on the towel bar.

In another embodiment, the second joint may be formed as a sleeve and the sleeve includes a groove extending longitudinally thereon to let the towel bar pass through such that the towel bar may be received in the sleeve.

In another embodiment, the sliding member may include a sleeve, and the first joint may include a bar portion to be received in the sleeve to enable a linear movement of the sliding member relative to the first joint.

In another embodiment, the first rear vane may include a towel bar parallel to the longitudinal direction of the rear vane. An end of the first joint may include an aperture to receive the towel bar to enable linear movement of the first joint relative to the towel bar.

In another embodiment, the vehicle air register assembly may further include a tab. The tab may include: a tab body having a channel in the middle to receive the first front vane, and two protrusions extending from two ends of the tab body. The two protrusions may respectively include a recess to receive the ends of the shaft of the front vane connector. The first front vane may extend through the channel and may be pivotably connected to the front vane connector via the tab body.

In another embodiment, the vehicle air register assembly may further include a plurality of front vanes linked with the first front vane and a plurality of rear vanes linked with the first rear vane.

In another embodiment, movement of the tab towards a first direction may cause the first rear vane and the plurality of rear vanes to move along the first direction to close the air register, and rotation of the tab towards a second direction may cause the first front vane and the plurality of front vanes to pivot along the second direction.

In another embodiment, the rear vane may include a first base and a second base. Two ends of the towel bar may respectively be connected to the first and second base, and the towel bar may be parallel to the rear vane and may be spaced from the plane of the rear vane with a predetermined distance.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present disclosure, reference should now be made to the one or more embodiments illustrated in greater detail in the accompanying drawings and described below wherein.

DETAILED DESCRIPTION OF ONE OR MORE EMBODIMENTS

As required, particular embodiments of the present vane adjustment device are disclosed herein; however, it is appreciated that the disclosed embodiments are merely exemplary and may be variable and modifiable. The drawings referenced herein are schematic and may be enlarged or minimized, and associated views thereof are not necessarily drawn to scale. As referenced in the FIG.s, the same reference numerals may be used herein to refer to the same parameters and components or their similar modifications and alternatives. These parameters and components are included as examples and are not meant to be limiting. Accordingly, particular structures and functional details as disclosed herein are not limiting, and are presented as representative basis via which those in the technical area may be guided to carry out the present vane adjustment device in various forms.

Adjustment devices for vehicle air registers often include a tab engaged with a vane. Normally the tab includes a fork-like structure to engage the vane and the adjustment devices references listed in the background utilize such a design. While a fork-like adjustment device can be convenient, there may also be disadvantages. For instance, the fork-like adjustment device requires enough space to be reserved on the adjacent vanes to avoid interference while moving around. Particularly in some designs wherein the space is limited and the shape of the air register is irregular, a part on adjacent vanes which may interfere with the fork-like structure has to be removed, which increases design complexity. In some cases, to ensure zero air flow in a closed position, larger cover plates may be required to cover the opening on the adjacent vanes, which may further lead to greater complexity, higher cost and undesired appearances. Moreover, the fork-like structure may affect the maximum air flow as it may have a relatively large projection area at the air flow direction. The adjustment devices in the present disclosure can at least address some of these issues.

Figure 1:
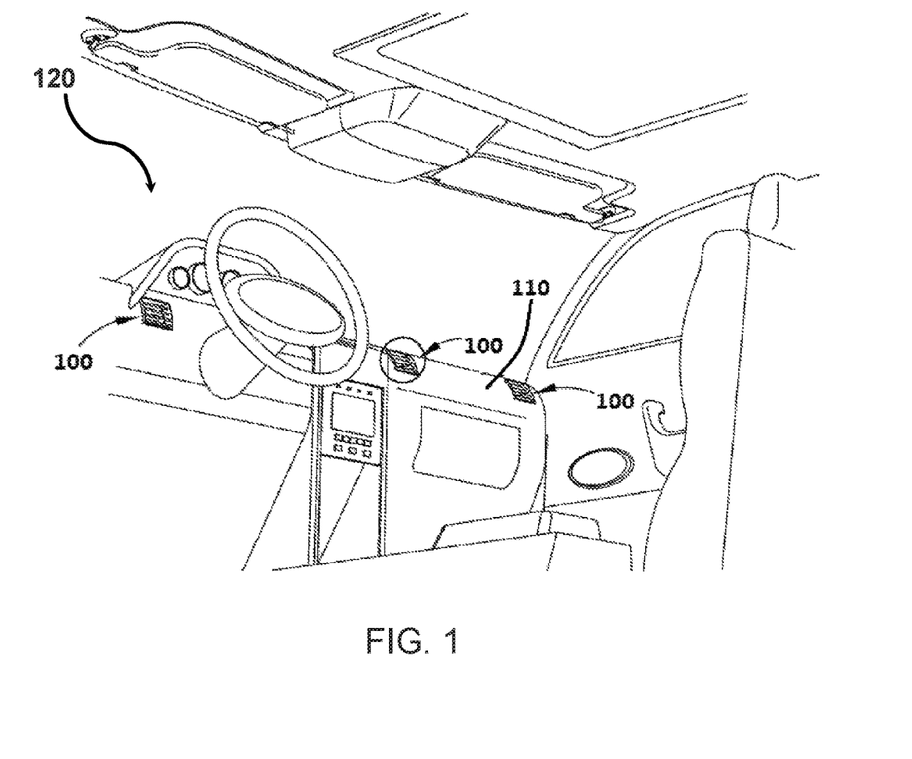
FIG. 1 schematically depicts a portion of a vehicle interior.

FIG. 1 schematically depicts a portion of vehicle interior of a vehicle 120 in one or more embodiments. As depicted in FIG. 1, the vehicle 120 includes an instrument panel 110 and one or more air register assemblies 100. Although the air register assembly 100 in FIG. 1 is shown to be located on the instrument panel 110 in front of the front row seats, other locations are possible. For instance, air registers may be located in other places to provide comfort for the second row passengers. For example, it may be provided on the central console facing the second row such that the passengers in the back seat may adjust the air register as necessary. Moreover, although the air register is discussed under the context of the vehicles, it should be appreciated that the present design may be applied in similar situations where air flow and direction need to be adjusted. In addition, vehicles should be interpreted to include trucks, cars, ships, airplanes and other means of transportation.

Figure 2:
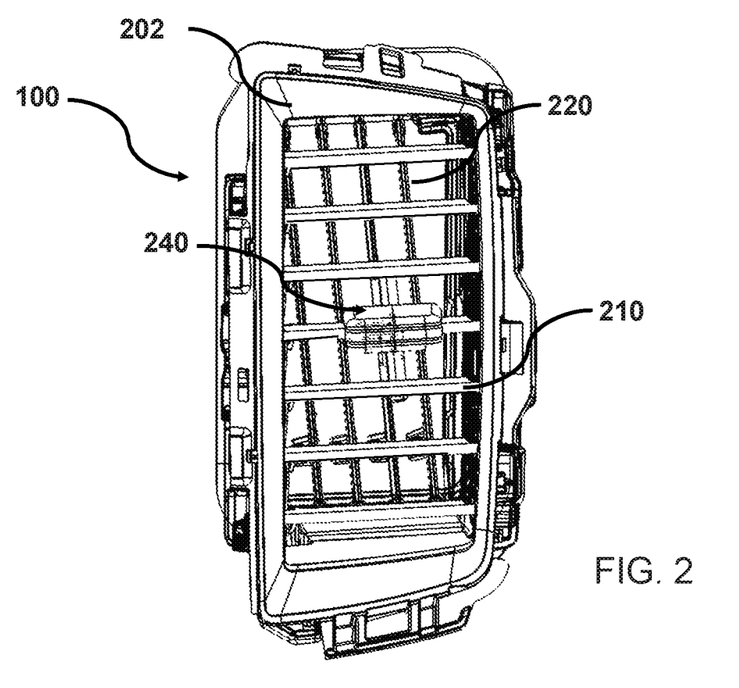
FIG. 2 schematically depicts a top view of a vehicle air register assembly according to one or more embodiments of the present disclosure.

FIG. 2 schematically depicts a top view of the vehicle air register assembly 100 according to one embodiment of the present disclosure. As shown in FIG. 2, in one or more non-limiting examples, the vehicle register assembly 100 may include an air register frame 202 located on the instrument panel or elsewhere, a number of linked front vanes 210 and a plurality of linked rear vanes 220. The detailed structure of the linkage design between the vanes will be omitted for brevity as there have been various available linkage mechanisms. Any appropriate linkage mechanisms available may be applied in the vehicle air register assembly 100 of the present disclosure.

In the present example, the air register assembly 100 includes an air register adjustment device 240 connected to both a front vane 210 and a rear vane 220. The front vane 210 and the rear vane 220 may be interchangeably referred to as "first front vane 210" and "first rear vane 220" herein or elsewhere. A user may regulate a direction and/or a flow rate of the air flow by pivoting the front vane 210 and the rear vane 220 via adjusting the air register adjustment device 240. It should be appreciated that "front" or "rear" as mentioned herein or elsewhere is for the ease of explanation of the relative positions of the vanes and is not intended to be limiting. For instance, a "front" vane may be a vane that is closer to a user at an assembled position, and a "rear" vane may be a vane that is further from the user relative to the "front" vane. Similarly "first" is not intended to be limiting and is simply for ease of explanation.

Figure 3A:
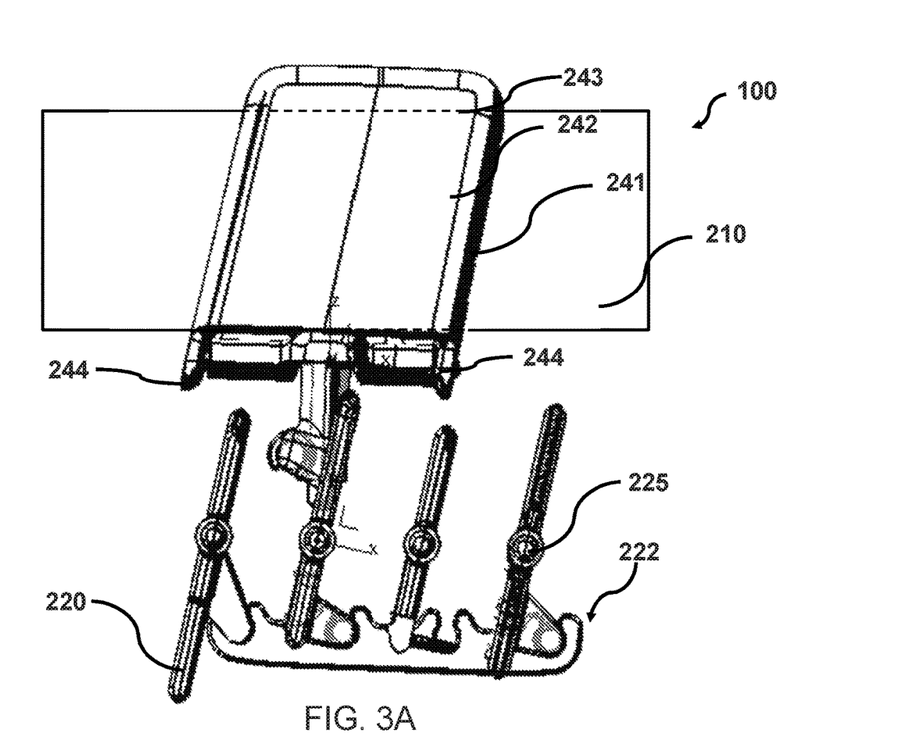
FIG. 3A schematically depicts a perspective view of an adjustment device of a vehicle air register assembly according to one embodiment of the present disclosure.
Figure 3B:
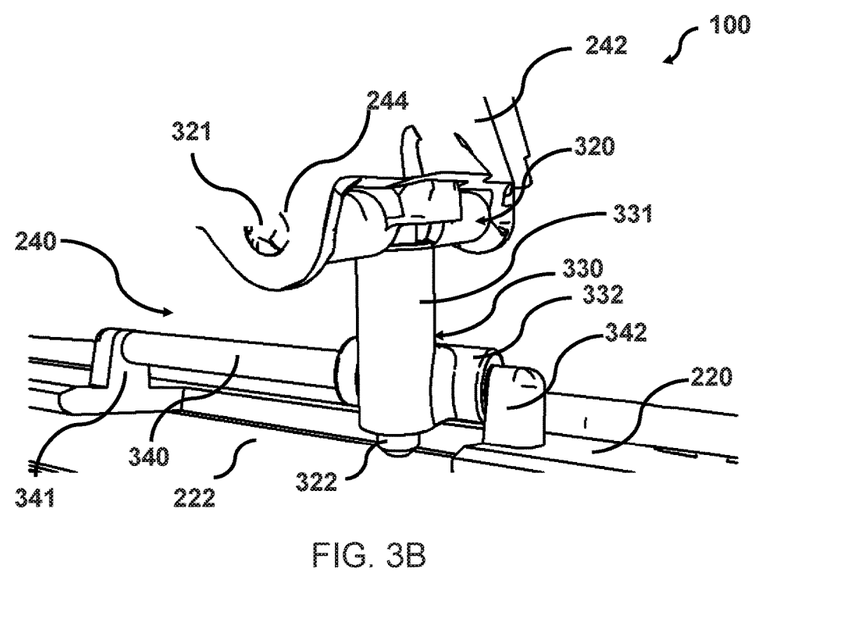
FIG. 3B schematically depicts a partially enlarged perspective view of the adjustment device of the vehicle air register assembly in FIG. 3A.
Figure 3C:
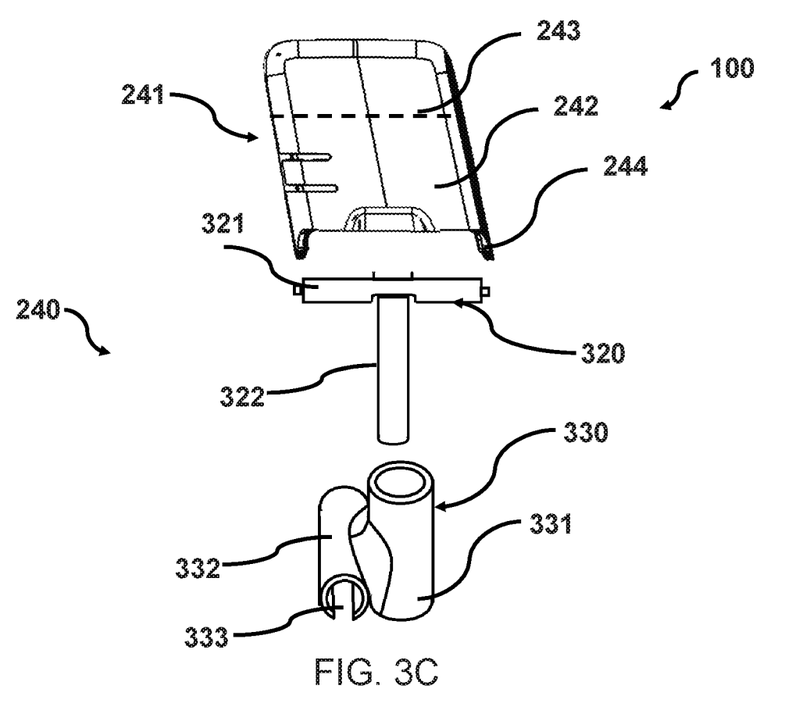
FIG. 3C schematically depicts an exploded view of the adjustment device of the vehicle air register assembly in FIG. 3A-FIG. 3B.

FIG. 3A though FIG. 3C illustratively depict a non-limiting example of the adjustment device 240 of the air register assembly 100. FIG. 3A schematically depicts a perspective view of the adjustment device 240 of the vehicle air register assembly 100 according to one embodiment of the present disclosure; FIG. 3B schematically depicts a partially enlarged view of the adjustment device 240 of the vehicle air register assembly 100 in FIG. 3A; FIG. 3C schematically depicts an exploded view of the adjustment device 240 of the vehicle air register assembly 100 in FIG. 3A though FIG. 3B. In one or more non-limiting examples as shown in FIG. 3A though FIG. 3B, the air register assembly 100 may include an air register adjustment device 240, a front vane connector 320 pivotably connected to a front vane 210, and a rear vane connector 330 pivotably connected to a rear vane 220, a tab 241 connected to the front vane 210 and a towel bar 340 connected to the rear vane 220. The tab 241 may include a tab body 242. The tab body 242 may have a channel 243 in the middle to receive the first front vane 210. The front vane connector 320 may be pivotably connected to the front vane 210 via the tab 241.

In some embodiments, the towel bar 340 of the air register assembly 100 may be connected to the first rear vane 220 and parallel to the lengthwise direction of the rear vane 220. The rear vane connector 330 may be pivotably connected to the rear vane 220 via the towel bar 340.

Referring to FIG. 3C, in another one or more non-limiting examples of the present disclosure, the air register adjustment device 240 may similarly include the front vane connector 320 connected to the front vane 210 and the rear vane connector 330 connected to the rear vane 220. The front vane connector 320 may have a sliding member 322 that is substantially perpendicular to a lengthwise direction of the front vane 210, and a shaft 321 connected to the sliding member 322 at an angle. Referring to FIG. 2 and further in view of FIG. 3A to 3C, in one or more non-limiting examples, the shaft 321 may be pivotably connected to the front vane 210. In some examples, the shaft 321 may be substantially perpendicular to the sliding member 322. "Perpendicular" relation between two members may mean that the main longitudinal axes of the two members are perpendicular to each other. In some examples, the shaft 321 and the sliding member 332 may be formed integrally, for instance via injection molding in a non-limiting example. By providing a shaft 321, a pivot connection may be easily realized and the connection, pivoting and/or linear movement between the front vane connector 320 and the front vane 210 may be more stable. Perpendicular shaft 321 relative to the sliding member 332 may bring desired strength, a smaller package volume, and a smaller space required for operation. In some other examples, it should be appreciated that the shaft 321 may not be needed, and other mechanisms may be used to pivotably connect one end of the sliding member 332 to the front vane 210.

Again referring to FIG. 3C, in one or more non-limiting examples, the tab body 242 may have two protrusions 244 extending from the ends, and the two protrusions 244 may respectively have a recess to receive the ends of the shaft 321 of the front vane connector 320, and thus shaft 321 may be pivotably connected to the tab body 242. The front vane 210 may extend through the channel 243 and be pivotably connected to the front vane connector 320 via a tab body 242 or the front vane may be rotated around the shaft 321. It should be appreciated that other modifications may be made to the connection between the front vane 210 and the tab body 241.

Again referring to FIG. 3C, in some other examples the rear vane connector 330 may include a first joint 331. The first joint 331 may be movably connected to the sliding member 322 of the front vane connector 320 such that the sliding member 322 may be linearly movable relative to the first joint 331. In the non-limiting examples as shown in FIG. 3A to FIG. 3C, the sliding member 322 may have a bar shape and the first joint 331 may include a sleeve to receive the sliding member 322. Thus the sliding member (bar shape) 322 may be linearly movable relative to the first joint 331 (for instance the sleeve shown in Figures). In the depicted embodiment, the first joint 331 is formed as a hollow sleeve 331 such that the sliding member 322 may pass through the sleeve 331. It should be appreciated that various sliding rail and slider designs may be adopted so long as relative movement can be realized. In one or more non-limiting examples, a certain space may be preserved between the sleeve 331 and the sliding member 322 to facilitate easy relative movement therebetween.

Referring to FIG. 3A to FIG. 3C, in another non-limiting example, the rear vane connector 330 may include a second joint 332 connected to the first joint 331 at an angle. The second joint 332 may be connected to the rear vane 220 via the towel bar 340 which may be provided on a rear vane 220. The second joint 332 may include a hollow sleeve to receive the towel bar 340 and may be linearly movable relative to the towel bar 340. The relative linear movement between the towel bar 340 and the second joint 332 may allow pivoting of the front vane connector 320 hence angle adjustment of the front vane 210. Moreover, the towel bar 340 may be pivotable relative to the second joint 332 to facilitate adjustment of the opening or closing position or angle of the rear vane 220.

Again as shown in FIG. 3C, in a non-limiting example, the second joint 332 may include a groove 333 extending thereon longitudinally. The groove 333 may be substantially parallel to a lengthwise direction of the rear vane 220. The towel bar 340 may be snapped into the second joint 332 via the groove 333. The groove 333 may facilitate assembling of the towel bar 340 and the second joint 332. Flexibility of the material at the edge of the groove 333 (in other words flexibility of the material of the second joint 332) may be utilized for assembly of the members. After assembly, while the user adjusts the angle of the air register, the groove 333 and the towel bar 340 will not be subjected to a disengaging force (in other cases may be subjected to a force that is very limited in amount). As such the groove 333 provides convenience in assembly while preventing disengagement.

Further referring to FIG. 3A to FIG. 3C, in another example, the second joint 332 (for instance in the form of a sleeve) and the first joint 331 (again for instance in the form of a sleeve) may be substantially perpendicular to each other. The perpendicular relation can provide a more balanced force applied to both parts and can minimize or reduce required package space and operation space. In another embodiment, the first joint 331 and the second joint 332 may be formed integrally for instance via injection molding.

Figure 6A:
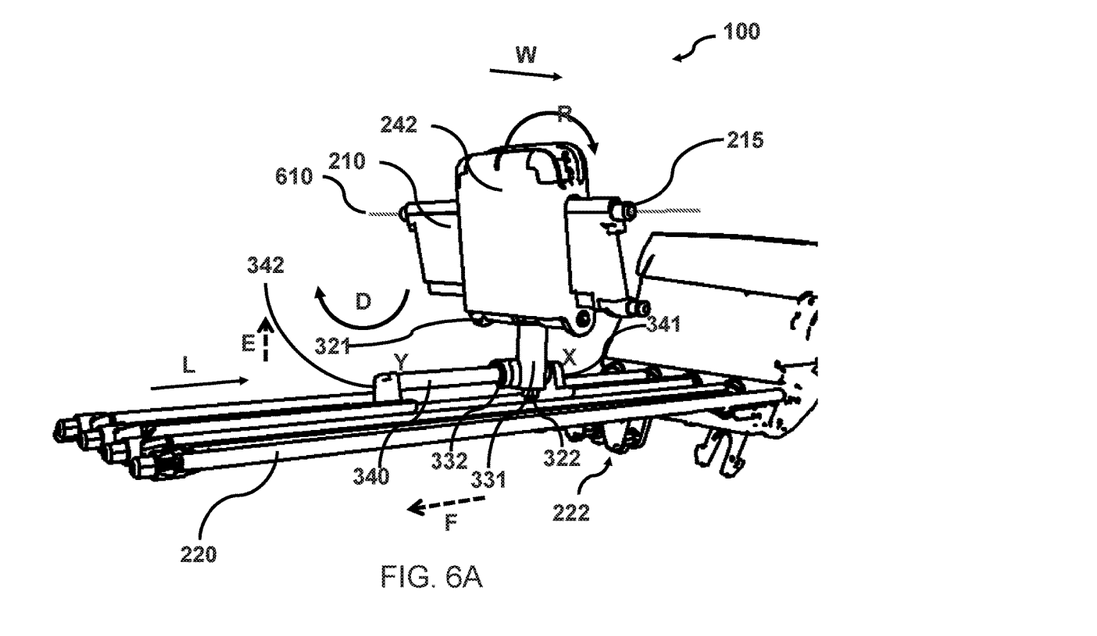
FIG. 6A schematically depicts a perspective view of the air register assembly at a closed status with the front vanes being at a first position.
Figure 6B:
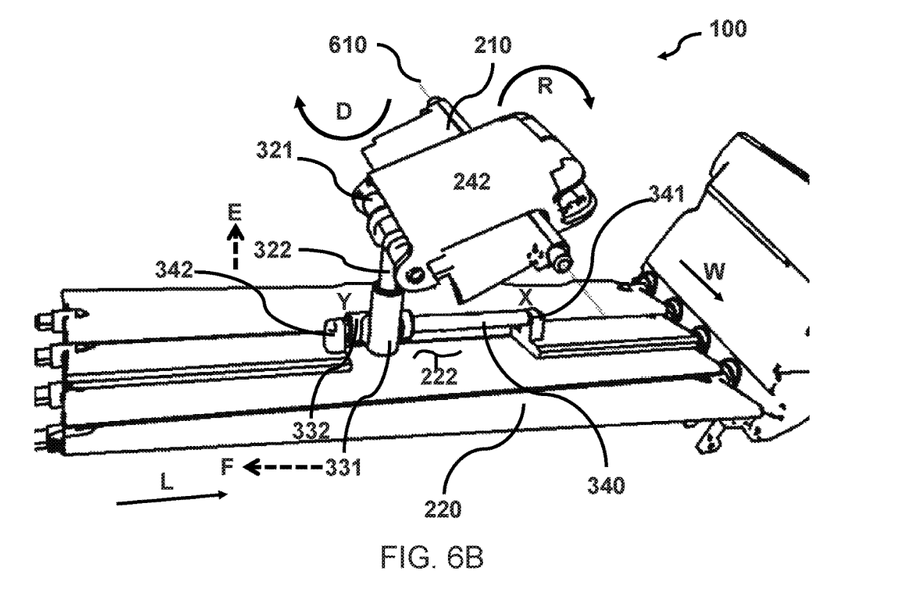
FIG. 6B schematically depicts a perspective view of the air register assembly in FIG. 6A, with the front vanes being at a second position.

Referring to FIG. 6B, the air register assembly 100 may similarly include the towel bar 340 connected to the rear vane 220. The towel bar 30 may be connected to the rear vane 220 via a first base 341 and a second base 342. Specifically, the rear vane 220 may include an opening 222 extending along its lengthwise direction and the first and second bases 341, 342 located at or adjacent to two sides of the opening 220. The first and second bases 341 and 342 may protrude from a surface of the rear vane 220 and two ends of the towel bar 340 may be respectively connected to the bases 341 and 342. In one example, the towel bar 340 may be parallel to the rear vane 220 and may be spaced from the rear vane 220 at a predetermined distance. The bases 341 and 342 may define a distance of the towel bar 340 to a plane of the rear vane 220.

Figure 4:
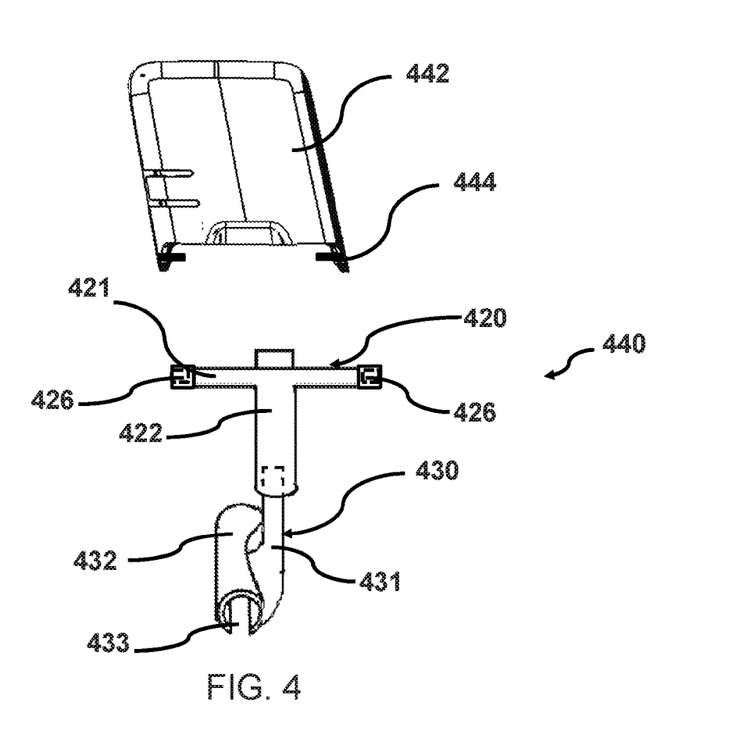
FIG. 4 schematically depicts an exploded view of an air register adjustment device according to another embodiment of the present disclosure.

Referring to FIG. 4, another embodiment of the air register adjustment device 440 is shown. The adjustment device 440 may include a front vane connector 420 and a rear vane connector 430. As depicted in FIG. 4, in the illustrated example, the front vane connector 420, which is connected to the first front vane 210, may include a sliding member 422 that is at least partially in the form of a hollow sleeve 422. The rear vane connector 430, which is connected to the first rear vane 220, may include a first joint (bar shaped) 431 that is received in the sleeve 422 such that the sleeve 422 may be linearly movable relative to the bar shaped first joint 431.

It should be appreciated that the rear vane connector 430 may be movably connected to the towel bar 340 via any appropriate mechanisms. For instance, the end of the first joint 431 may include an aperture to receive the towel bar 340 on the rear vane 220 such that the first joint 431 may be linearly movable relative to the tow bar 340. In other words, the rear vane connector 430 may include only the first joint 431. In the example shown in FIG. 4, the rear vane connector 430 includes a second joint 432 and the second joint 432 similarly includes a groove 433 to enable the towel bar 340 of the rear vane 220 to be snapped into the second joint.

Additionally, the non-limiting example as shown in FIG. 4 further provides an alternative way to connect the tab 442 to the front vane connector 420. As shown in FIG. 4, the tab 442 includes protrusions 444 extending from the ends. The front vane connector 420 includes a sliding member 422 and a shaft 421 that is connected to and perpendicular to the sliding member 422. The ends of the shaft 421 include respectively recesses 426 to receive the protrusions 444. The protrusions 444 and the recesses 426 are configured to enable the tab 442 to rotate around the shaft.

Now referring to FIG. 5A to FIG. 6B and further referring to FIG. 3A to FIG. 3C, details of the air register assembly 100 according to one or more embodiments of the present disclosure as well as how to adjust the front vane 210 and rear vane 220 will be explained further. It should be appreciated that although the following description is directed to the exemplary structure of the adjustment device shown in FIG. 3A to FIG. 3C, the operation may also be applied to structures in alternative examples. FIG. 3A to FIG. 3C and FIG. 5A to FIG. 6B illustrate a vehicle air register assembly 100 in one or more examples, comprising a first front vane 210 extending along a first direction (for instance the direction W); a first rear vane 220 extending a second direction (for instance the direction L); and an air register adjustment device 240, wherein the air register adjustment device 240 may include a front vane connector 320 connected to the first front vane 210 and a rear vane connector 330 connected to the first rear vane 220. The front vane connector 320 may include a shaft 321 pivotably connected to the first front vane 210 and a sliding member 322 substantially perpendicular to the shaft 321; the rear vane connector 330 may include a first joint 331, where the sliding member 322 may be movably connected to the first joint 331 and linearly movable to the first joint 331. The air register assembly 100 may further include a tab 241 pivotably connected to the front vane connector 320 and a towel bar 340 connected to the rear vane 210. In the example shown in FIG. 3A to FIG. 3C, the sliding member 322 has a bar shape and the first joint 331 includes a sleeve to receive the sliding member 322 to enable a linear movement of the sliding member 322 relative to the first joint 331. In the exemplary embodiment, the rear vane connector 330 may include a second joint 332 connected to and substantially perpendicular to the first joint 331. Refer to FIG. 6A to FIG. 6B, the first rear vane 220 may include a towel bar 340 substantially parallel to a lengthwise direction of the first rear vane 220, and the second joint 332 is movably connected to the towel bar 340 and is linearly movable along the towel bar 340 between a first position X and a second position Y.

Further referring to FIG. 3A to FIG. 3C, the air register assembly 100 includes a tab 241 movably connected to the front vane 210. The tab 241 may include a tab body 242. The tab body 242 may have a channel to allow the first front vane 210 to pass through and the tab body 242 may be moved relative to the first front vane 210 (motion will be described in more details). Two protrusions 244 may be provided to extend from the ends of the tab body 242, and the two protrusions 244 may be pivotably connected to the two ends of the shaft 321 of the front vane connector 320. The first front vane 210 may pass through the channel and may be pivotably connected to the front vane connector 320 via the tab body 242. Although details of example relating to the connection between the tab 241 and the first front vane 210 and the front vane connector 320 have been discussed, other alternatives or modifications can be contemplated.

Again referring to FIG. 3A to FIG. 3C and FIG. 5B to FIG. 6B, in one or more examples, the towel bar 340 may be substantially parallel to the rear vane 220 and may be spaced from the plane of the rear vane 220 at a certain distance. The two ends of the towel bar 340 may be respectively connected to the base 341 and 342, and the bases 341 and 342 may define the distance of the towel bar 340 to the plane of the rear vane 220. Additionally, the first joint 331 and the second joint 332 of the rear vane connector 330 are perpendicular to each other, and the central axis of the first joint 331 and the second joint 332 are not in the same plane. The sliding member 322 of the front vane connector 320 may be retracted into the first joint (sleeve) 331 of the rear vane connector 330, and thus the rear vane 220 may not need a large opening/space for the front vane connector 320 and the rear vane connector 330 to realize pivoting and linear movement. In some embodiments, by providing bases 341 and 342, the towel bar 340 and the rear vane 220 disposed in different planes and/or the first joint 331 and the second joint 332 in different planes, the adjusting angle of the front and rear vanes may be larger and conveniently realized. Additionally, potential interference between the sliding member 322, the rear vane 220 and the towel bar 340 may be avoided. As shown in FIG. 6A to FIG. 6B, in the closed position, the above mentioned embodiments may provide sufficient pivoting space for rear vane connector 330 without interfering with other adjacent vanes.

Operations of the air register will be explained in more details with reference to the exemplary air register.

Figure 5A:
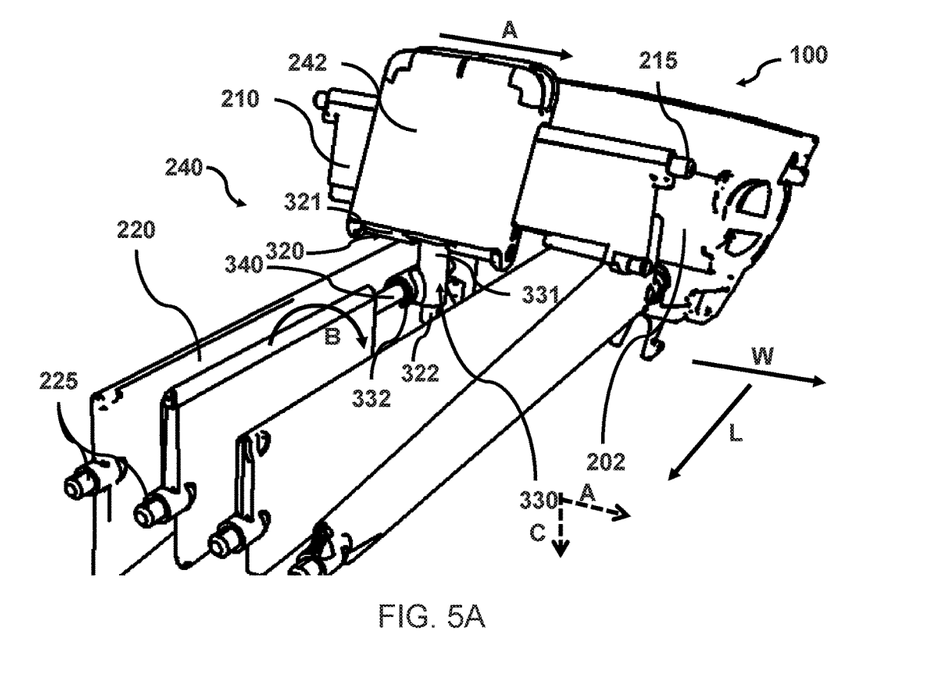
FIG. 5A schematically depicts a perspective view of an air register assembly at a largest air flow rate according to one embodiment of the present disclosure.
Figure 5B:
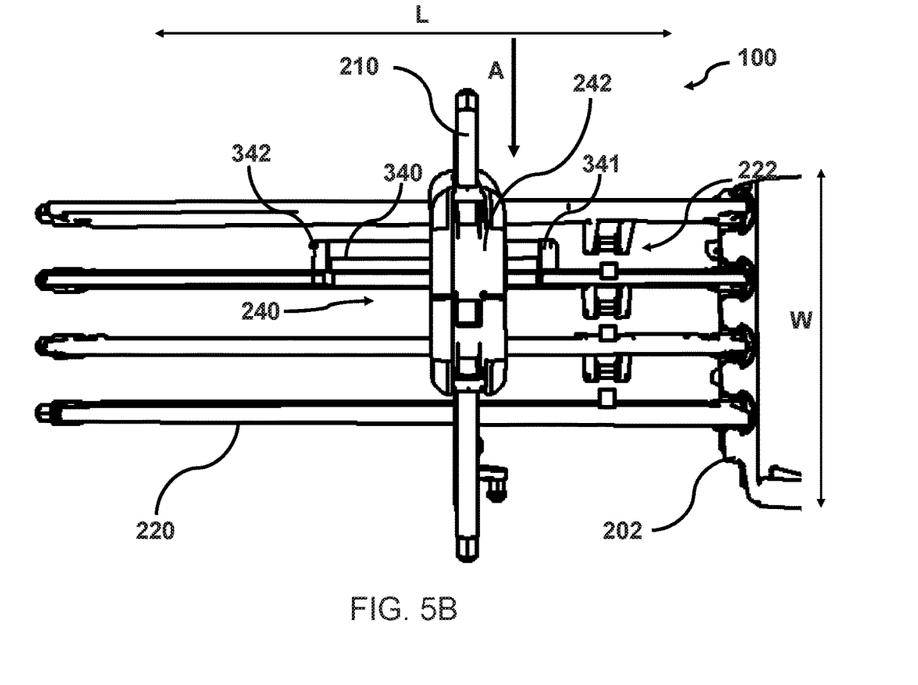
FIG. 5B schematically depicts a top view of the air register assembly in FIG. 5A.

Referring to FIG. 5A and FIG. 5B, the front vane 210 and the rear vane 220 are substantially perpendicular to each other. As such the largest air flow rate is allowed at this position. When the user pushes the tab body 242 along the direction A (lengthwise direction of the front vane 210), the tab body 242 may linearly move on the front vane 210 along the direction A. The linear movement of the tab body 242 will not cause rotation or other movement of the front vane 210. In other words, the front vane 210 may be positioned at any rotation angle. That is, the front vane connector 320 and the rear vane connector 330 may be located at any position on the towel bar 340 and linear movement of the tab body 242 generally will not cause any linear movement of the connectors relative to the towel bar 340. While the linear movement of the tab body 242 will not cause rotation of front vane 210, it may cause the shaft 321 of front vane connector 320 to slide along the direction A. As the shaft 321 is fixedly connected to the sliding member 322 (for instance a bar shaped member), the sliding member 322 may move or slide as well along the direction A and push the first joint 331 (for instance sleeve). The first joint 331 may then cause the second joint 332 (for instance sleeve) to have a tendency to move along the direction A. Because the second joint 332 is installed on the towel bar 340 of the rear vane 220 and the rear vane 220 is provided at a fixed location in a vehicle, the rear vane 220 may only pivot but cannot move along the direction A. Further, the tendency of the rear vane connector 320 to move along with the sliding member 322 along the direction A may encounter a counterforce from the rear vane 220. Thus the first joint 331 of the rear vane connector 320 may move along direction A and cause the towel bar 340 to move toward the direction A and pivot about the axis 225 of the rear vane 220. Meanwhile, subjected to the pivoting of the towel bar 340, the second joint 332 on one hand moves linearly along the direction A, and on the other hand linearly moves relative to the sliding member 322 of the front vane connector 320 along the direction C. As a result, the rotation of the towel bar 340 around the axis 225 of the rear vane 220 may cause the rear vane 220 and other associated rear vanes to pivot likewise and in one example cause the rear vanes 220 to close as shown in FIG. 6A and FIG. 6B. The operation mentioned above may adjust the rear vanes 220 to regulate the flow rate. It should be appreciated that the angle of air flow may also be adjusted. While the above description is provided with reference to the direction A, it should be appreciated that the adjustment device may be operated in an opposite direction in a similar principle and thus detailed description is omitted here for brevity.

Referring to FIG. 5B, a top view of the front vane 210 and the rear vane 220 is illustrated to show that the front vane 210 and the rear vane 220 are perpendicular to provide the maximum air flow. The embodiments of the present disclosure are simple and can provide a larger air flow compared to the adjustment device including the fork structure. As shown in FIG. 5B, in the direction vertically penetrating into the paper, the front vane 210, the rear vane 220, the front vane connector 320 as well as the rear vane connector 330 have a relatively small projection area which results in reduced blockage or negative impact to the flow rate (also flow rate at other relative positions).

Referring to FIG. 6A and FIG. 6B, a perspective view of the air register assembly 100 with the rear vane at a closed status with the front vanes being at a first position X and a second position Y are shown respectively according to one or more embodiments. As mentioned above, a force along the direction A to the tab 241 may cause the rear vanes 220 to shut off completely. Now the adjustment of front vane 210 while rear vanes 220 are closed will be discussed. It should be appreciated that the rear vane 220 may be positioned at any rotation status (open/closed state) and its position will not affect the adjustment of the front vane 210. Additionally, it could be appreciated that the length of the towel bar 340, or the distance between the first position X and the second position Y may, for example, be configured based on the size of the vane, angle of the adjustment, or a length of the linear movement of the sliding member 322 relative to the first joint 331. In the depicted example, in the position X as shown in FIG. 6A, the sliding member 322 is completely received in the first joint 331 (most overlap), and the shaft 321 is closest to the towel bar 340. With the rotation of the front vane 210, the shaft 321 pivots and causes the sliding member 322 to pivot and moves away from the rear vane connector 330. As shown in the position Y in FIG. 6B, the sliding member 322 is engaged with the first joint 331 to a smallest extent (i.e., least overlap) to ensure the connection between the sliding member 322 and the first joint 331 such that the shaft 321 may be at a greatest distance relative to the towel bar 340. It should be appreciated that the relative position of the sliding member 322 and the first joint 331 in other examples may not necessarily change from aforementioned most overlap to least overlap. The sliding member 322 and the first joint 331 may have most overlap in the middle of the towel bar 340, and least overlap when moving to the ends (for instance X, Y position). In this case the sliding member 322 and the first joint 331 may have a smaller size. Those who are skilled in the art may have other modifications.

Now again referring to FIG. 6A, when moving the tab body 242 along the direction R to pivot about the axis 610 of the front vane 210, the shaft 321 of the front vane connector 320 may be caused to pivot along the direction D. Meanwhile, as the shaft 321 is connected with the sliding member 322 (e.g. bar shaped), the sliding member 322 may have a tendency to pivot along the direction D and cause the first joint (sleeve) 331 of the rear vane connector 330 to pivot along the direction D. As the towel bar 340 is fixed on the rear vane 220, it cannot pivot along direction D. Due to the restriction of the towel bar 340, the first joint (sleeve) 331 may be forced to move towards direction F by the pivoting force of the shaft 321 (e.g., travelling from the end X shown in FIG. 6A towards the end Y shown in FIG. 6B). On the other hand, the sliding member 322 may move up linearly relative to the first joint 331 (along the direction E) to complete the rotation of the front vane 210. While the front vanes are connected together via linkage mechanisms, the front vane 210 may cause the linked front vanes to pivot to adjust the angle of the front vanes and thus the angle of the air flow. The angle adjustment may also cause slight air flow rate changes because of differences in area that blocks the air flow or air flow rate loss due to different vane positions. It should be appreciated that during the process, the rear vane 220 may not pivot, and pivoting of the tab body 242 may only cause the front vane 210 to pivot. The pivoting as shown by arrows R and D may be broken down into a linear movement of the front vane connector 320 relative to the rear vane connector 330 (as shown by arrow E) and a linear movement of the rear vane connector 330 relative to the tow bar 340 of the rear vane 220 (as shown by arrow F).

It should be appreciated that, to facilitate relative linear movement between the sliding member 322 of the front vane connector 320 and the first joint (sleeve) 331 of the rear vane connector 330, certain clearance may be provided between the sleeve 331 and the sliding member 322. In one or more examples, lubricant may be applied such that when the sliding member 332 travels along the direction A, the sleeve 331 may be caused to travel along direction A. Meanwhile the sleeve 331 may move linearly relative to the sliding member 332 with low friction without affecting the angle of the front vane 210. When pivoting the sliding member 332 along the direction R or D, the sliding member may also move upwards relative to the sleeve 331 with relatively low friction without dragging the sleeve upwards and affecting the rear vane 220. By providing a clearance and lubricant between the sliding member 332 and the sleeve 331, relative movement between them may become easier and high friction force or unwanted movement of the vanes may be avoided.

As is described in the specification, one or more embodiments of the vehicle air register and adjusting device are provided. By using a front vane connector and a rear vane connector that are able to move linearly relative to each other, rotation movement may be broken down into linear movement. In this way, the structure of the air register may be simplified and the package may be smaller. It should be contemplated that the present disclosure may be applied in other suitable fields as well. Those skilled in the art will readily recognize from such discussion, and from the accompanying drawings and claims that various changes, modifications and variations can be made therein without departing from the true spirit and fair scope of the invention as defined by the following claims.

What is claimed is:

1. A vane adjustment device, comprising:
   a front vane connector pivotably connected to a front vane, said front vane connector including a sliding member substantially perpendicular to a longitudinal direction of the front vane; and
   a rear vane connector pivotably connected to a rear vane, said rear vane connector including a first joint;
   wherein the first joint is movably connected to the sliding member to enable a first linear movement of the sliding member relative to the first joint.

2. The vane adjustment device of claim 1, wherein the sliding member has a bar shape and the first joint includes a first sleeve to receive the sliding member.

3. The vane adjustment device of claim 2, wherein the rear vane connector includes a second joint connected to the first joint at an angle, the second joint including a second sleeve to receive a towel bar disposed on the rear vane to enable a second linear movement of the second joint relative to the towel bar.

4. The vane adjustment device of claim 3, wherein the second joint includes a groove extending longitudinally thereon.

5. The vane adjustment device of claim 3, wherein the second joint is substantially perpendicular to the first joint.

6. The vane adjustment device of claim 3, wherein the first joint and the second joint are formed integrally.

7. The vane adjustment device of claim 1, wherein the sliding member includes at least a partially hollowed sleeve portion and the first joint has a bar shape and is received in the sleeve portion to enable a second linear movement of the sliding member relative to the sleeve portion.

8. The vane adjustment device of claim 7, wherein an end of the first joint includes an aperture to receive a towel bar on the rear vane to enable a third linear movement of the first joint relative to the towel bar.

9. The vane adjustment device of claim 1, wherein the front vane connector includes a shaft connected to the sliding member at an angle, said shaft being pivotably connected to the front vane.

10. The vane adjustment device of claim 9, wherein the shaft and the sliding member are substantially perpendicular to each other.

11. A vehicle air register assembly, comprising:
    a first front vane extending along a first direction;
    a first rear vane extending along a second direction; and
    a vane adjustment device, said vane adjustment device including:
    a front vane connector connected to the first front vane, said front vane connector having a shaft pivotably connected to the first front vane and a sliding member substantially perpendicular to the shaft; and
    a rear vane connector connected to the first rear vane, wherein said rear vane connector includes a first joint;
    wherein the sliding member is movably connected to the first joint to enable a first linear movement relative to the first joint.

12. The vehicle air register assembly of claim 11, wherein said sliding member has a bar shape and the first joint includes a first sleeve to at least partially receive the sliding member.

13. The vehicle air register assembly of claim 12, wherein rear vane connector includes a second joint connected to and perpendicular to the first joint.

14. The vehicle air register assembly of claim 13, wherein the first rear vane includes a towel bar substantially parallel to a longitudinal direction of the first rear vane and wherein the second joint is movably connected to the towel bar and is linearly movable between a first position and a second position on the towel bar.

15. The vehicle air register assembly of claim 14, wherein the second joint includes a second sleeve and said sleeve includes a groove extending longitudinally thereon to let the towel bar pass through such that the towel bar is received in the sleeve.

16. The vehicle air register assembly of claim 11, wherein the sliding member includes a third sleeve, and the first joint includes a bar portion to be received in the third sleeve to enable said first linear movement of the sliding member relative to the first joint.

17. The vehicle air register assembly of claim 11, wherein the first rear vane includes a towel bar parallel to a longitudinal direction of the first rear vane.

18. The vehicle air register assembly of claim 17, further including a tab, said tab including:
    a tab body having a channel to receive the first front vane, and
    two protrusions extending from two ends of the tab body, the two protrusions respectively including a recess to receive ends of the shaft,
    wherein the first front vane extends through the channel and is pivotably connected to the front vane connector via the tab body.

19. The vehicle air register assembly of claim 18, further including a plurality of front vanes linked with the first front vane and a plurality of rear vanes linked with the first rear vane,
    wherein movement of the tab towards the first direction causes the first rear vane and the plurality of rear vanes to move along the first direction to close the air register assembly, and rotation of the tab towards the second direction causes the first front vane and the plurality of front vanes to pivot along the second direction.

20. The vehicle air register assembly of claim 14, wherein the first rear vane includes a first base and a second base, wherein two ends of the towel bar are respectively connected to the first base and the second base and said towel bar is parallel to the first rear vane and is spaced from a plane of the first rear vane by a predetermined distance.

* * * * *